(12) United States Patent
Du et al.

(10) Patent No.: US 11,157,315 B2
(45) Date of Patent: Oct. 26, 2021

(54) METHOD FOR PROCESS MANAGEMENT AND ELECTRONIC DEVICE

(71) Applicant: GUANGDONG OPPO MOBILE TELECOMMUNICATIONS CORP., LTD., Guangdong (CN)

(72) Inventors: Bing Du, Guangdong (CN); Zhiyong Lin, Guangdong (CN); Jun Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 128 days.

(21) Appl. No.: 16/746,220

(22) Filed: Jan. 17, 2020

(65) Prior Publication Data
US 2020/0151009 A1    May 14, 2020

Related U.S. Application Data

(63) Continuation of application No. PCT/CN2018/092041, filed on Jun. 20, 2018.

(30) Foreign Application Priority Data

Jul. 31, 2017   (CN) .......................... 201710644146.3

(51) Int. Cl.
G06F 9/46   (2006.01)
G06F 9/48   (2006.01)

(52) U.S. Cl.
CPC ............ G06F 9/4881 (2013.01); G06F 9/485 (2013.01); *G06F 2209/482* (2013.01); *G06F 2209/484* (2013.01)

(58) Field of Classification Search
CPC .. G06F 9/4881; G06F 9/485; G06F 2209/482; G06F 2209/484
See application file for complete search history.

(56) References Cited

U.S. PATENT DOCUMENTS

| 2009/0276782 A1 | 11/2009 | Wang et al. |
| 2015/0066157 A1 | 3/2015 | Karypis et al. |
| 2015/0347192 A1 | 12/2015 | Blaine et al. |

FOREIGN PATENT DOCUMENTS

| CN | 103019813 A | 4/2013 |
| CN | 103970596 A | 8/2014 |

(Continued)

OTHER PUBLICATIONS

European partial search report, European Application No. 18841031.0, dated Jun. 17, 2020 (13 pages).

(Continued)

*Primary Examiner* — Diem K Cao
(74) *Attorney, Agent, or Firm* — Young Basile Hanlon & MacFarlane, P.C.

(57) ABSTRACT

A method for process management in an electronic device is disclosed. The method includes: acquiring a set of association processes corresponding to an application in the electronic device and priority levels of association processes, wherein the set of association processes includes a primary process of the application and at least one secondary process bound to the primary process; acquiring an operation state of the primary process and an operation state of each of the at least one secondary process, respectively; and adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

20 Claims, 15 Drawing Sheets

(56) References Cited

FOREIGN PATENT DOCUMENTS

| | | | |
|---|---|---|---|
| CN | 104199669 A | 12/2014 | |
| CN | 104199731 A | 12/2014 | |
| CN | 104331327 A | 2/2015 | |
| CN | 104503841 A | 4/2015 | |
| CN | 105550041 A | 5/2016 | |
| CN | 105843650 A | 8/2016 | |
| CN | 106445696 A | 2/2017 | |
| CN | 106648861 A | 5/2017 | |
| CN | 106951318 A | 7/2017 | |
| CN | 107479954 A | 12/2017 | |

OTHER PUBLICATIONS

Xu D: Performance Study and Dynamic Optimization Design for Thread Pool Systems,International Conference on Computer Communication and Controltechnologies:CCCT & International Conference on Informationsystems Analysis Andsynthesis:ISAS,XX, XX,Aug. 14, 2004 (Aug. 14, 2004), pp. 1-6.

European search report,European Application No. 18841031.0, dated Oct. 2, 2020. (14 pages).

International search report,PCT/CN2018/092041, dated Sep. 18, 2018(2 pages).

First Office Action from China patent office in a counterpart Chinese patent Application 201710644146.3, dated Jan. 8, 2019 (6 pages).

The State Intellectual Property Office of Peopele'sRepublic of China, Notification to Grant Patent Right for CN Application 201710644146.3, dated Sep. 19, 2019 (2 pages).

Indian examination Report for IN Application 202017008334 dated May 28, 2021. (7 pages).

| Application A | | |
|---|---|---|
| Association processes | | |
| Process name | Operation state | Priority level |
| Primary processes a | non-running | 4 |
| Secondary processes b | non-running | 4 |
| Secondary processes d | non-running | 4 |
| Secondary processes c | running | 3 |

FIG. 4

METHOD FOR PROCESS MANAGEMENT AND ELECTRONIC DEVICE

CROSS-REFERENCE TO RELATED APPLICATION(S)

This application is a continuation application of International Patent Application No. PCT/CN2018/092041, filed on Jun. 20, 2018, which claims priority to Chinese Patent Application No. 201710644146.3, filed on Jul. 31, 2017, the contents of both of which are herein incorporated by reference in their entireties.

TECHNICAL FIELD

The present disclosure relates to the field of electronic technology, and specifically to a method process management, an electronic device, and a non-transitory storage medium.

BACKGROUND

With the rapid development of electronic device, the functions of electronic devices are getting stronger and stronger, and the number of applications is increasing.

In current electronic devices, such as smart phones, each invoked process consumes a certain amount of resources. For background application programs, when a pulling-up action are performed for different programs, different application programs are usually pulled up according to priority levels thereof. Currently, existing applications often have fixed priority levels. Users cannot implement limited adjustments when the users are not clear. Usually, some service processes are bound to an application program, and if the application program has higher priority level, the service processes continue to be run even when they are not running, because they are bounded to the application. This increases power consumption of the electronic devices.

SUMMARY

According to one aspect of the present disclosure, embodiments of the present disclosure provides a method for process management in an electronic device, including: acquiring a set of association processes corresponding to an application in the electronic device and priority levels of association processes, wherein the set of association processes includes a primary process of the application and at least one secondary process bound to the primary process; acquiring an operation state of the primary process and an operation state of each of the at least one secondary process, respectively; and adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

According to another aspect of the present disclosure, embodiments of the present disclosure further provides an electronic device including a non-transitory memory storing a plurality of instructions, and a processor, wherein loading the plurality of instructions, the processor is configured to perform: acquiring a set of association processes corresponding to an application in the electronic device and priority levels of association processes, wherein the set of association processes includes a primary process of the application and at least one secondary process bound to the primary process; acquiring an operation state of the primary process and an operation state of each of the at least one secondary process, respectively; and adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

According to yet another aspect of the present disclosure, embodiments of the present disclosure further provides a non-transitory storage medium storing a plurality of instructions, when executed, causing a processor to perform a method for process management, wherein the method includes: acquiring a primary process of an application and at least one secondary process and priority levels of the primary process and the at least one secondary process, wherein the at least one secondary process is bound to the primary process; acquiring an operation state of the primary process and an operation state of each of the at least one secondary process, respectively; and adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

BRIEF DESCRIPTION OF DRAWINGS

Detailed embodiments of the present disclosure are described in detail with the accompanying drawings to make technical solutions and other advantageous effects of the present disclosure clearer.

FIG. 4 is a schematic diagram of a third application scenario for a method for process management according to embodiments of the present disclosure.

DETAILED DESCRIPTION

Figure 1:
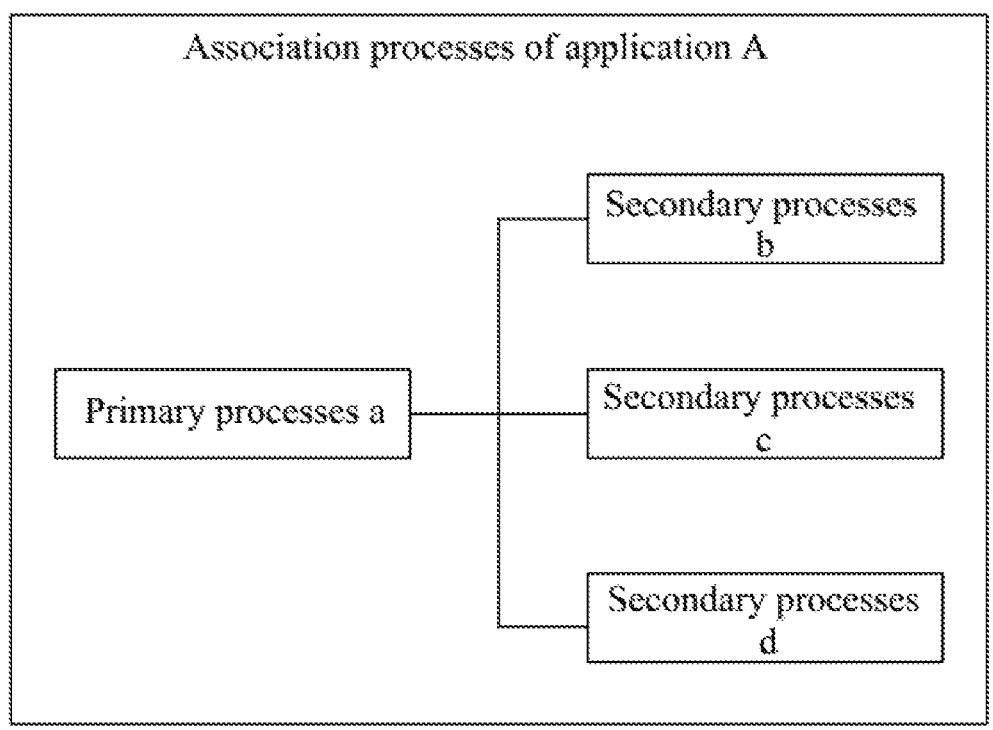
FIG. 1 is a schematic diagram of a first application scenario for a method for process management according to embodiments of the present disclosure.

Referring to the drawings, in which like reference numerals represent same components, the principles of the present disclosure are illustrated by the implementation in a suitable computing environment. The following description is based on specific embodiments of the present disclosure as illustrated, and should not be construed as limiting other specific embodiments that are not described herein.

Embodiments of the present disclosure provides a method for process management in an electronic device, including: acquiring a set of association processes corresponding to an application in the electronic device and priority levels of association processes, wherein the set of association processes includes a primary process of the application and at least one secondary process bound to the primary process; acquiring an operation state of the primary process and an operation state of each of the at least one secondary process, respectively; and adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

In some embodiments, the adjusting a binding state between the primary process and each of the at least one secondary process and performing a priority adjustment for the primary process and each of the at least one secondary process between which are in the adjusted binding state according to the operation state of the primary process and the operation state of each of the at least one secondary process includes: maintaining the binding state between the primary process and the at least one secondary process in response to the primary process and the at least one secondary process all being in a non-running state; and decreasing priority levels of the primary process and the at least one secondary process.

In some embodiments, after the decreasing priority levels of the primary process and the at least one secondary process, further including: shutting down the set of association processes to release buffer resource occupied by the set of association processes.

In some embodiments, the adjusting a binding state between the primary process and each of the at least one secondary process and performing a priority adjustment for the primary process and each of the at least one secondary process between which are in the adjusted binding state according to the operation state of the primary process and the operation state of each of the at least one secondary process includes: unbinding a specific secondary process from the set of association processes in response to the primary process being in a non-running state and the specific secondary process of the at least one secondary process being in a running state; and decreasing priority levels of the unbound set of association processes, wherein the unbound set of association processes includes the primary process in the non-running state and others of the at least one secondary process without the specific secondary process.

In some embodiments, the adjusting a binding state between the primary process and each of the at least one secondary process and performing a priority adjustment for the primary process and each of the at least one secondary process between which are in the adjusted binding state according to the operation state of the primary process and the operation state of each of the at least one secondary process includes: unbinding a specific secondary process from the set of association processes in response to the primary process being in a running state and the specific secondary process of the at least one secondary process being in a non-running state; and decreasing a priority level of the unbound specific secondary process in the non-running state.

In some embodiments, further including: acquiring an operation state of another secondary process in response to the primary process being in a running state and the another secondary process associated with the primary process being unbound to the primary process; adding the another secondary process into the set of association processes to bind the another secondary process to the primary process in response to the another secondary process being in the running state; and increasing priority levels of the added set of association processes.

In some embodiments, before the acquiring a set of association processes corresponding to an application in the electronic device and priority levels of association processes, further including: determining whether the application is a background application and a duration of the application being in the background is greater than a preset threshold, to perform the acquiring a set of association processes corresponding to an application in the electronic device and priority levels of association processes, in response to the application being the background application and the duration being greater than the preset threshold.

Embodiments of the present disclosure further provides an electronic device including a non-transitory memory storing a plurality of instructions, and a processor, wherein loading the plurality of instructions, the processor is configured to perform: acquiring a set of association processes corresponding to an application in the electronic device and priority levels of association processes, wherein the set of association processes includes a primary process of the application and at least one secondary process bound to the primary process; acquiring an operation state of the primary process and an operation state of each of the at least one secondary process, respectively; and adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

In some embodiments, the processor is further configured to perform maintaining the binding state between the primary process and the at least one secondary process in response to the primary process and the at least one secondary process all being in a non-running state; and decreasing priority levels of the primary process and the at least one secondary process.

In some embodiments, after the decreasing priority levels of the primary process and the at least one secondary process, the processor is further configured to perform shutting down the set of association processes to release buffer resource occupied by the set of association processes.

In some embodiments, the processor is further configured to perform unbinding a specific secondary process from the set of association processes in response to the primary process being in a non-running state and the specific secondary process of the at least one secondary process being in a running state; and decreasing priority levels of the unbound set of association processes, wherein the unbound set of association processes includes the primary process in the non-running state and others of the at least one secondary process without the specific secondary process.

In some embodiments, the processor is further configured to perform unbinding a specific secondary process from the set of association processes in response to the primary process being in a running state and the specific secondary process of the at least one secondary process being in a non-running state; and decreasing a priority level of the unbound specific secondary process in the non-running state.

In some embodiments, the processor is further configured to perform acquiring an operation state of another secondary process in response to the primary process being in a running state and the another secondary process associated with the primary process being unbound to the primary process; adding the another secondary process into the set of association processes to bind the another secondary process to the primary process in response to the another secondary process being in the running state; and increasing priority levels of the added set of association processes.

In some embodiments, the processor is further configured to perform determining whether the application is a background application and a duration of the application being in the background is greater than a preset threshold, to perform the acquiring a set of association processes corresponding to an application in the electronic device and priority levels of association processes, in response to the application being the background application and the duration being greater than the preset threshold.

Embodiments of the present disclosure further provides a non-transitory storage medium storing a plurality of instructions, when executed, causing a processor to perform a method for process management, wherein the method includes: acquiring a primary process of an application and at least one secondary process and priority levels of the primary process and the at least one secondary process, wherein the at least one secondary process is bound to the primary process; acquiring an operation state of the primary process and an operation state of each of the at least one secondary process, respectively; and adjusting a binding state between the primary process and each of the at least one secondary process according to the operation state of the primary process and the operation state of each of the at least one secondary process, and performing a priority adjustment for the primary process and each of the at least one secondary process between which are in the adjusted binding state.

In some embodiments, the at least one secondary process includes a first secondary process, and the primary process and the first secondary process all are in a non-running state; the first secondary process is maintained to be bound to the primary in response to the primary process and the first secondary process all being in a non-running state.

In some embodiments, the primary process and the first secondary process are shut down.

In some embodiments, the at least one secondary process includes a first secondary process, and the primary process is in a non-running state and the first secondary process is in a running state; the first secondary process of the at least one secondary process is adjusted to be unbound to the primary process, and priority levels of the primary process and others of the at least one secondary process are decreased, in response to the primary process being in the non-running state and the first secondary process being in the running state.

In some embodiments, the at least one secondary process includes a first secondary process, and the primary process is in a running state and the first secondary process is in a non-running state; the first secondary process of the at least one secondary process is adjusted to be unbound to the primary process, and priority levels of the first secondary process is decreased, in response to the primary process being in the running state and the first secondary process being in the non-running state.

In some embodiments, the method further includes: acquiring an operation state of another secondary process in response to the primary process being in a running state and the another secondary process associated with the primary process being unbound to the primary process; binding the another secondary process to the primary process in response to the another secondary process being in a running state; and increasing priority levels of the primary process and the another secondary process.

FIG. 1 illustrates a first application scenario for a method for process management. For ease of description, only parts related to the content of the present disclosure are shown in the figure.

The execution subject of embodiments of the present disclosure may be an electronic device, and the electronic device may include a mobile phone (or "cellular" phone, such as a smart phone) or a computer with a wireless communication module, such as a tablet computer. The electronic device may also be a portable, pocket-sized, handheld on-board computer that exchanges language and/or data with the wireless access network, for example, Personal Communication Service (PCS) phones, cordless phones, Session Initiation Protocol (SIP) phones, Wireless Local Loop (WLL) stations, Personal Digital Assistants (PDA), which is not limited herein.

The electronic device has a system installed with different applications. A set of association processes of application A is shown in FIG. 1. The set of association processes of application A include a primary process "a" and a secondary process "b", a secondary process "c", and a secondary process "d" bound to the primary process "a". As the above processes are in a binding relationship, the related association processes are pulled up as a whole when the system pulls up processes of application A, or the related association processes are also shut down as a whole when the system shuts down the processes of application A.

Figures 2, 3:
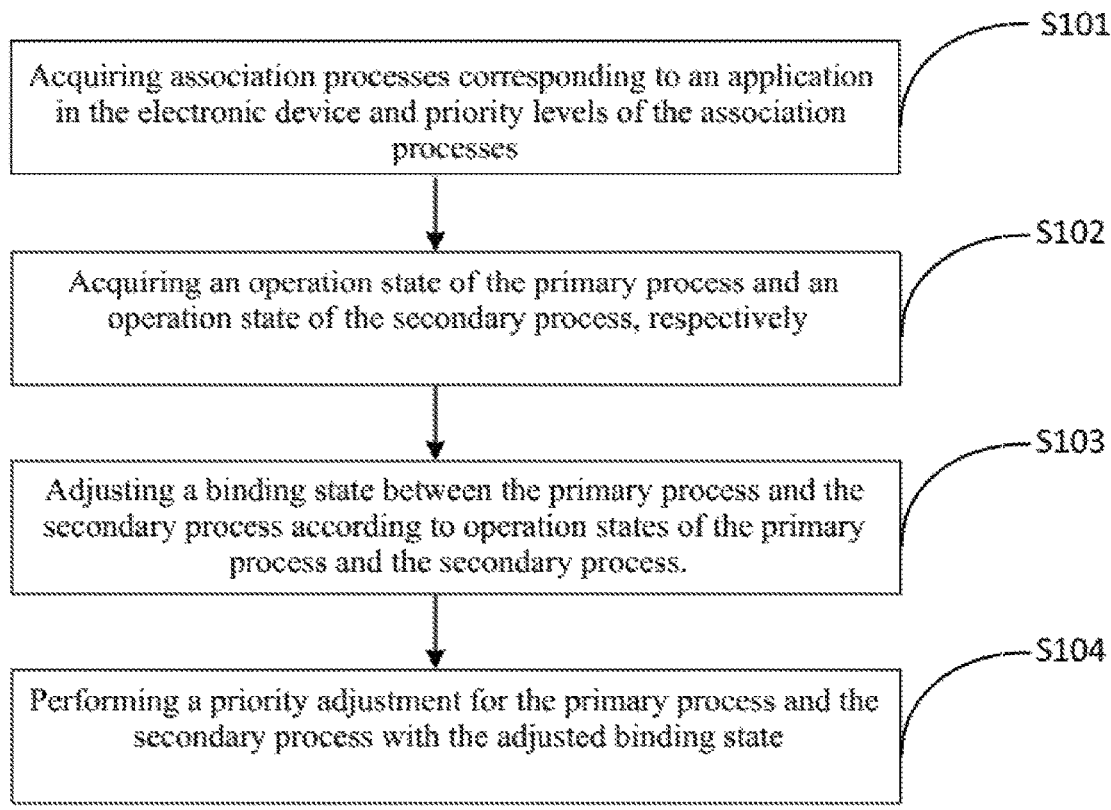
FIG. 2 is a flow chart implementing a method for process management according to embodiments of the present disclosure.
FIG. 3 is a schematic diagram of a second application scenario for a method for process management according to embodiments of the present disclosure.

FIG. 2 illustrates a flow chart implementing a method for process management. For the convenience of description, only parts related to the content of the present disclosure are shown in the figure.

As shown in FIG. 2, a method for process management includes actions/operations in the following blocks.

At block S101, the method acquires a set of association processes corresponding to an application in the electronic device and priority levels of association processes in the set of association processes.

In some embodiments, the set of association processes include a primary process of the application and at least one of secondary process bound to the primary process. The primary process is a process for implementing most of main functions of the application and controlling to invoke the secondary process associated with the primary process. In some cases, the primary process can also be called as a parent process or a program process. A secondary process is used for processing service functions related to the application, such as updating and monitoring the application. In some cases, the secondary process can also be called as a child process or a service process.

Acquiring the set of association processes corresponding to the application means that information of the association processes may be acquired from a system process configured to manage the association processes. The information may be used for managing the association processes such as shut-downing, starting-up, and adjusting binding relationship and priority, which is not limited herein.

FIG. 3 illustrates a second application scenario for a method for process management. For example, a set of association processes of application A are acquired. The set of association processes of application A may include a primary process "a", and a secondary process "b", a secondary process "c", and a secondary process "d" bound to the primary process "a". And it is acquired that the primary process and secondary processes of application A have a priority level "3". The content of the present disclosure will be demonstrated based on this example.

At block S102, the method acquires an operation state of the primary process and an operation state of each of the at least one secondary process, respectively.

In some embodiments, the operation state of the primary process and the operation state of each of the at least one secondary process may be acquired by a related program or process for managing the operation state of the primary process and the operation state of each of the at least one secondary process. The operation state may include "running" and "non-running". The specific state types can be defined according to the actual situation.

As shown in FIG. 3, for example, the operation states of primary process "a", and secondary process "b", secondary process "c", and secondary process "d" bound to the primary process "a" may be acquired to know that the operation state of the primary process "a" is "non-running" and the operation states of secondary process "b", secondary process "c", and secondary process "d" bound to the primary process "a" are "non-running", "running", and "non-running", respectively.

At block S103, the method adjusts a binding state between the primary process and each of the at least one secondary process according to the operation state of the primary process and the operation state of each of the at least one secondary process.

In some embodiments, most secondary processes associated with the primary process are bound to the primary process. Thus, the secondary process associated with the primary process can be invoked at any time when the primary process is running, which improves processing efficiency, the secondary process associated with the primary process can be shut down following the primary process, or a priority level of the primary process and a priority level of the secondary process associated with the primary process may be adjusted simultaneously when priority adjustment is performed for the application, making the primary process and the secondary process associated with the primary process be adjusted simultaneously.

In some embodiments, after all the operation states of the association processes of the application are obtained, the binding state between the primary process and each of the at least one secondary process in the set of association processes are adjusted according to the operation states of the primary process and the secondary process in the set of association processes. For example, in the example for block S103, when the operation state of the primary process "a" of application A is "non-running", it can be known that the primary process "a" should be unused, and the user may not have a high request to invoke the primary process "a". As the operation states of the secondary process "b", the secondary process "c", and the secondary process "d" bound to the primary process "a" are "non-running", "running", and "non-running", respectively, it can be determined that other secondary processes are not used except for the secondary process "c" being running as needed to be called by other programs. As the primary process and the at least one secondary process are in a binding state, the whole association processes corresponding to the application will be pulled up when process pulling-up is performed for the application. Thus, a process with low usage rate will occupy resources of the electronic device, causing unnecessary power consumption.

As shown in FIG. 4, in some embodiments, the application in the above example may unbind the running secondary process "c" to the primary process of the application, so that the secondary process "c" is separated from the binding of the whole association processes of the application, and then priority adjustment may be performed for the secondary process "c" and the original association processes, respectively. That is, the secondary process "c" is separated from the whole set of association processes of the application, and then priority adjustment may be performed for the secondary process "c" and other association processes of the set of association processes, respectively.

At block S104, the method performs a priority adjustment for the primary process and each of the at least one secondary process between which are in the adjusted binding state.

In some embodiments, after the binding state between the primary process and each of the at least one secondary process is adjusted according to the operation states of the primary process and each of the at least one secondary process, one corresponding process of the application may make the entire association processes to form one or two process combinations. At this time, the system can perform a priority adjustment according to operation state of the one or two process combinations to decrease a priority level of a process in-unuse and maintain or increase a priority level of a process in-use. Thus, it can be achieved that a targeted adjustment is performed for the priority levels of the primary process and the at least one secondary process corresponding to the application according to the operation states of the processes. For example, as shown in FIG. 4, the application in the above example unbinds the running secondary process "c" to the primary process of the application, so that the secondary process "c" is separated from the binding of the entire association processes of the application. Thus, the processes corresponding to the application is differentiated into the secondary process "c" and the unbound set of association processes without secondary process "c". Since the secondary process "c" is in the running state, a priority level of the secondary process "c" can be increased or maintained, which is maintained as the original priority level "3" in FIG. 4. Association processes other than the secondary process "c" are in the non-running state, and priority levels of the association processes can be decreased, which is decreased from the original priority "3" to "4" in FIG. 4. Thus, the system can avoid pulling up the association processes that are not commonly used by the application when the application is pulled up next time, without affecting the pulling-up of the commonly-used secondary process "c".

In the foregoing embodiments of the present disclosure, firstly, a set of association processes corresponding to an application in the electronic device and priority levels of the association processes are acquired, operation states of a primary process and a secondary process are then acquired, respectively, and the binding state between the primary process and the secondary process is adjusted according to the operation states of the primary process and the secondary process, so that the system adjusts the primary process and the secondary process in the association processes individually, and finally, priority adjustment is performed for the primary process and the secondary process between which are in the adjusted binding state according to the operation states of the primary process and the secondary process. Thus, the system can perform a targeted management for priority levels of processes in different operation states, avoiding frequently pulling up processes with low usage requirement or low importance, not affecting the operation of common service processes, and further reducing power consumption of the electronic device.

Figure 5:
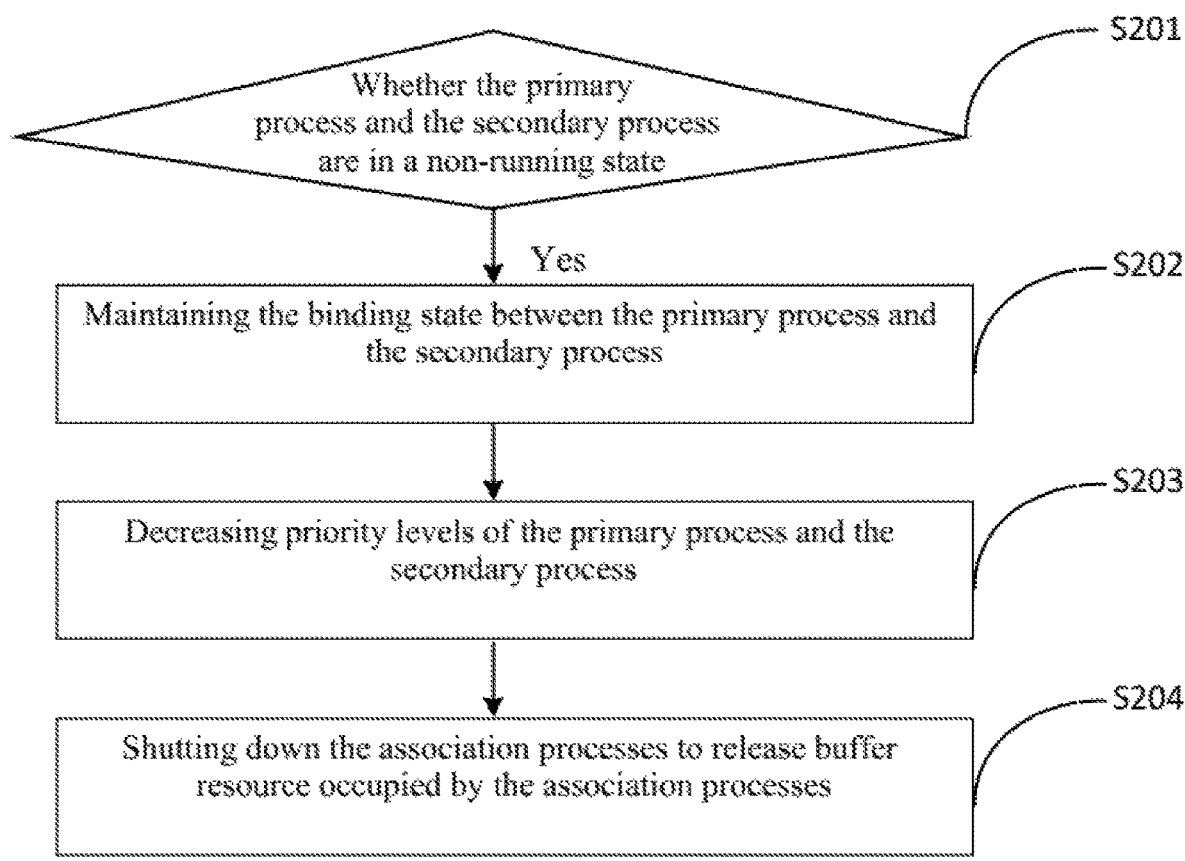
FIG. 5 is a first flow chart for adjusting a binding state and a priority level of an association process according to embodiments of the present disclosure.

FIG. 5 is a first flow chart for adjusting a binding state and a priority level of an association process according to the present disclosure.

In some embodiments, adjusting a binding state between the primary process and each of the at least one secondary process according to the operation state of the primary process and the operation state of each of the at least one secondary process, includes: maintaining the binding state between the primary process and the at least one secondary process in response to the primary process and the at least one secondary process all being in a non-running state.

As shown in FIG. 5, the flow specifically includes actions/operations in the following.

At block S201, whether both the primary process and a secondary process are in a non-running state is determined. If yes, the binding state between the primary process and the secondary process is maintained, and otherwise, no other actions are performed. After the operation states of the primary process and the secondary process related to the application A are obtained, whether both the primary process and the secondary process are in the non-running state is determined. If both the primary process and the secondary process are in the non-running state, it indicates that the application A is an application with low usage rate.

At block S202, the binding state between the primary process and the secondary process is maintained when both the primary process and the secondary process are in the non-running state. The binding state between the primary process and the secondary process is maintained, and then priority adjustment may be performed for the entire association processes of application A.

At block S203, priority levels of the primary process and the secondary process are decreased.

In some embodiments, if the operation states of both the primary process and the secondary process are in the non-running state, priority levels of the whole association processes of the application A may be decreased. This avoids a process with a lower usage rate being pulled up the next time the system pulls up, and then reduces power consumption of the electronic device.

At block S204, the set of association processes are shut down to release buffer resources occupied by the set of association processes.

When a process is in a non-running state, it may still occupy a certain amount of buffer resources. In this case, an association process can be completely shut down to release buffer resources occupied by the association process, which improves the operating efficiency of the electronic device.

Figure 6:
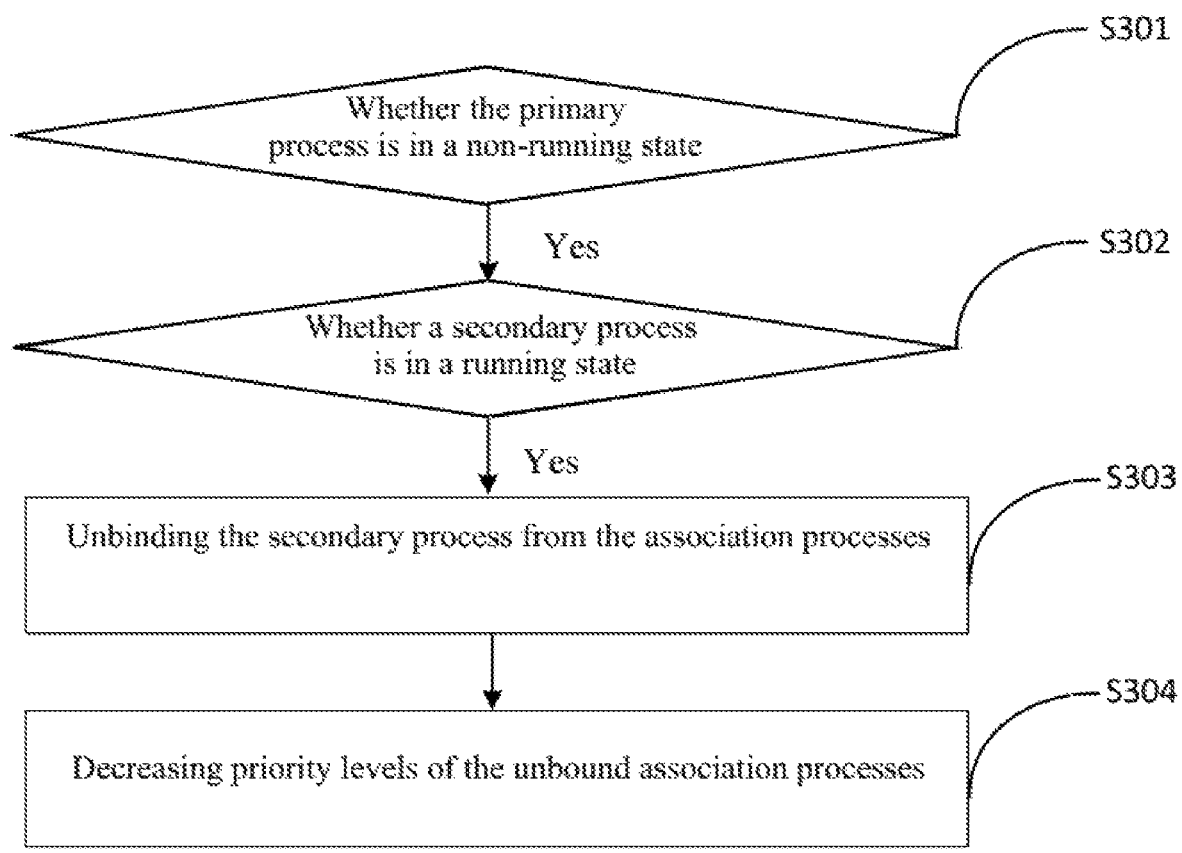
FIG. 6 is a second flow chart for adjusting a binding state and a priority level of an association process according to embodiments of the present disclosure.

FIG. 6 is a second flow chart for adjusting a binding state and a priority level of an association process according to embodiments of the present disclosure.

In some embodiments, adjusting a binding state between the primary process and each of the at least one secondary process according to the operation state of the primary process and the operation state of each of the at least one secondary process includes: unbinding a specific secondary process from the set of association processes in response to the primary process being in a non-running state and the specific secondary process of the at least one secondary process being in a running state.

As shown in FIG. 6, the flow includes actions/operations in the following.

At block S301, whether the primary process is in a non-running state is determined. If yes, whether there is a specific secondary process in a running state is determined. After the operation states of the primary process and the specific secondary process related to the application A is obtained, the operation state of the primary process is determined. It is further determined whether there is a specific secondary process being in a running state when the operation state of the primary process is in the non-running state.

At block S302, whether there is a specific secondary process in a running state is determined. If yes, the specific secondary process in the running state is unbound from the set of association processes.

Figure 7:
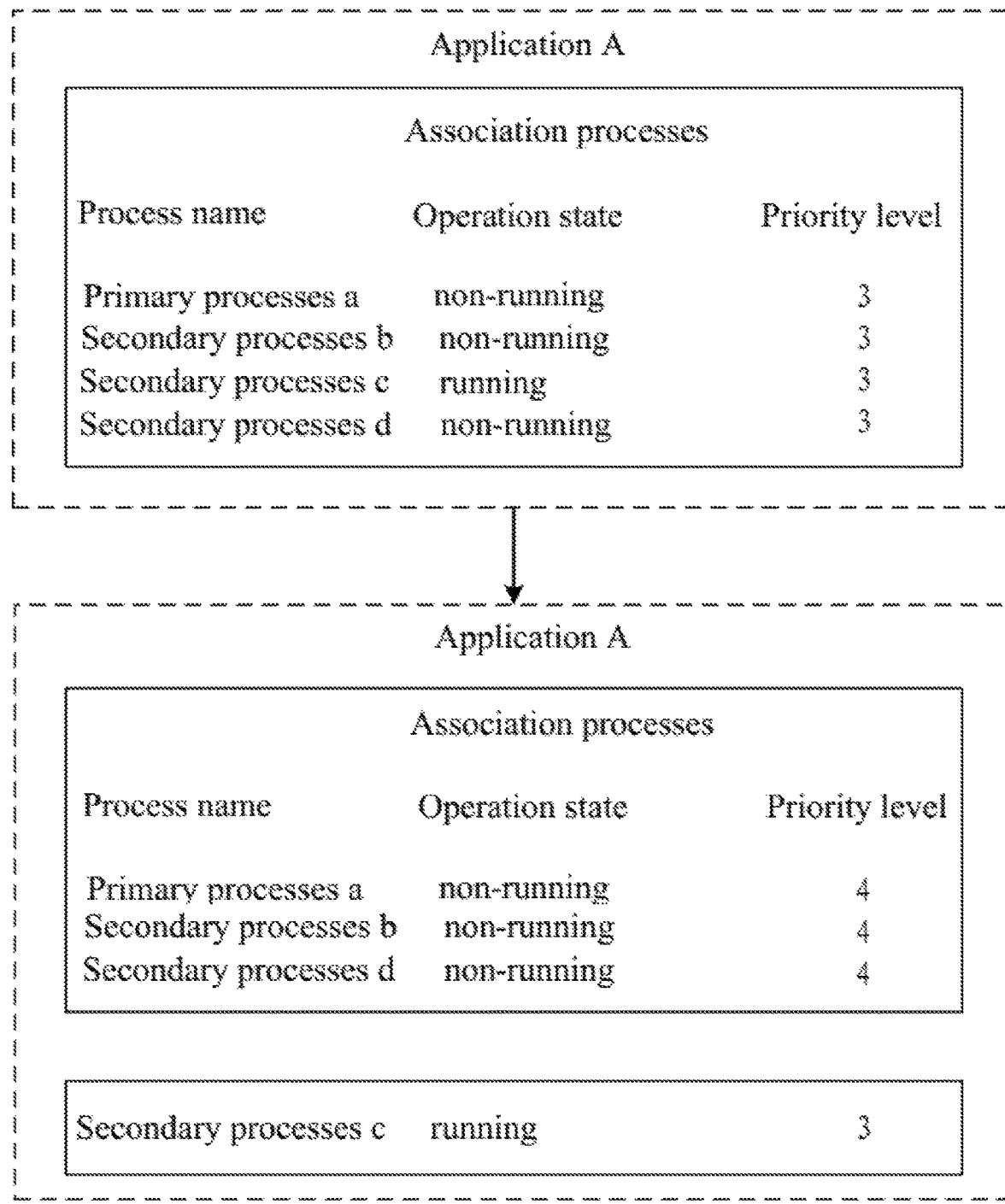
FIG. 7 is a schematic diagram of a fourth application scenario for a method for process management according to embodiments of the present disclosure.

FIG. 7 illustrates the operation states and priority levels of association processes related to the application A. It can be known that the primary process "a" of the application A is in a non-running state, and it can be continued to determine whether there is a secondary process in running state. If it is determined that the secondary process "c" is in the running state, the secondary process in the running state is unbound from the association processes.

At block S303, the secondary process in the running state is unbound from the set of association processes.

In some embodiments, during the unbinding, a part of processes are unbound by modifying relevant parameters of the application A, so that the processes can be processed separately when process invoking or process priority level setting is performed.

As shown in FIG. 7, for example, the secondary process "c" is in the running state, and the other association processes are in the non-running state. In this case, the secondary process "c" can be unbound to the primary process of the application A, such that two process combinations are formed.

At block S304, priority levels of the unbound set of association processes is decreased.

Because other association processes of application A are not running, they will consume unnecessary power when they are frequently pulled up by the system. In order to avoid unnecessary response when pulling up next time, priority levels of other association processes of application A can be decreased.

For example, as the secondary process "c" in FIG. 7 is in the running state, priority level of the secondary process "c" is not adjusted, maintaining at "3", while priority levels of other association processes of application A are decreased, being adjusted at "4". If the system pulls up processes having a priority level "3" or more than "3" when pulling up, only the secondary process "c" will be pulled up, and other association processes of application A will not respond. Thus, the power consumption of the electronic device can be reduced, and the endurance of the electronic device can be improved.

Figure 8:
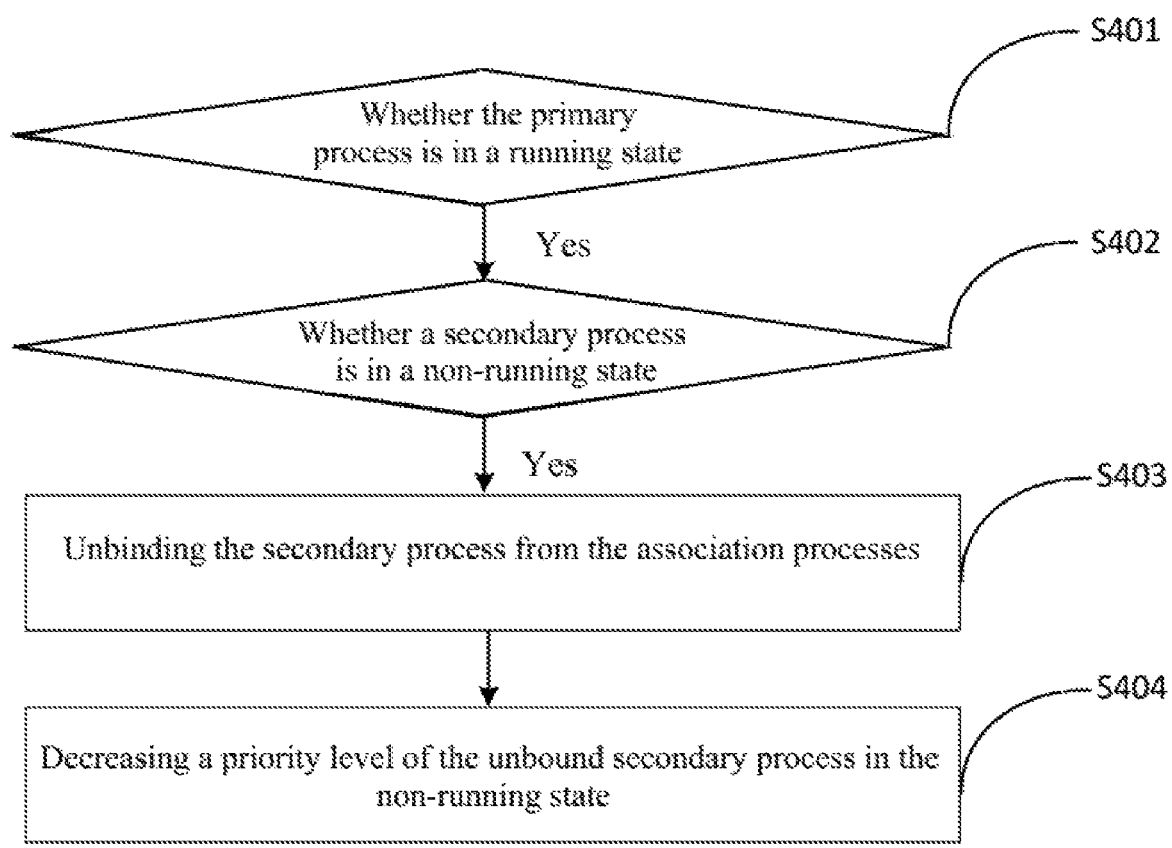
FIG. 8 is a third flow chart for adjusting a binding state and a priority level of an association process according to embodiments of the present disclosure.

FIG. 8 is a third flow chart for adjusting a binding state and a priority level of an association process according to embodiments of the present disclosure.

In some embodiments, adjusting a binding state between the primary process and each of the at least one secondary process according to the operation state of the primary process and the operation state of each of the at least one secondary process includes: unbinding a specific secondary process from the set of association processes in response to the primary process being in a running state and the specific secondary process of the at least one secondary process being in a non-running state.

As shown in FIG. 8, the flow includes actions/operations in the following. At block S401, whether the primary process is in a non-running state is determined. If yes, whether there is a specific secondary process in a running state is determined.

After the operation states of the primary process and the specific secondary process related to the application A are obtained, the operation state of the primary process is determined. It is further determined whether there is a specific secondary process in a running state when the operation state of the primary process is in the non-running state.

Figure 9:
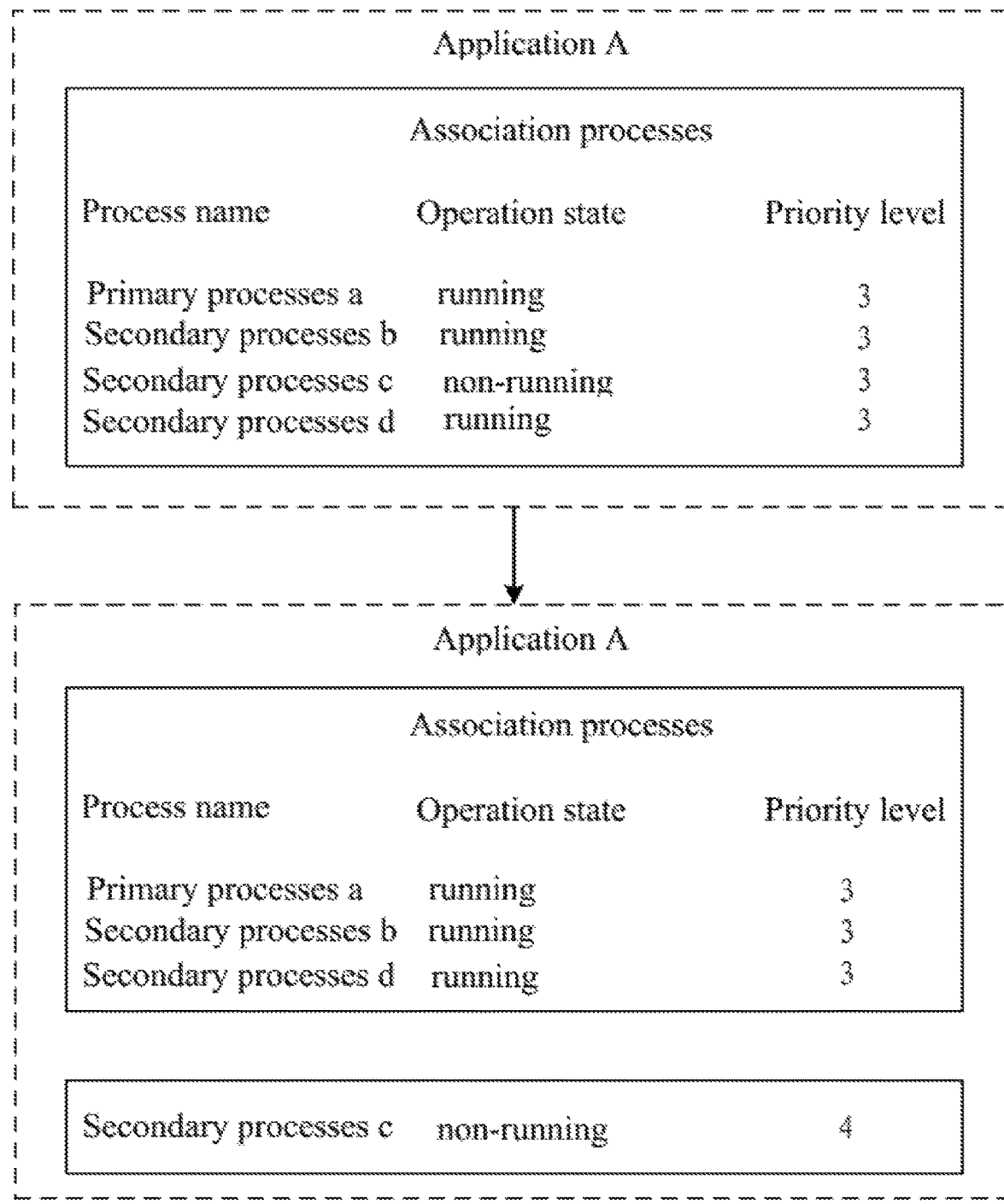
FIG. 9 is a schematic diagram of a fifth application scenario for a method for process management according to embodiments of the present disclosure.

At block S402, whether there is a specific secondary process in a non-running state is determined. If yes, the specific secondary process in the non-running state is unbound from the set of association processes. FIG. 9 illustrates operation states and priority levels of the association processes related to the application A. It can be known that the primary process "a" of the application A is in a running state, and it can be continued to determine whether there is a secondary process in non-running state. If it is determined that the secondary process "c" is in the non-running state, the secondary process "c" in the non-running state is unbound from the association processes.

At block S403, the specific secondary process in the non-running state is unbound from the set of association processes.

In some embodiments, during the unbinding, a part of processes are unbound by modifying relevant parameters of the application A, so that the processes can be processed separately when process invoking or priority level setting is performed.

As shown in FIG. 9, for example, the secondary process "c" is in the non-running state, and the other association processes are in the running state. In this case, the secondary process "c" can be unbound to the primary processes of the application A, such that two process combinations are formed.

At block S404, a priority level of the unbound specific secondary process is decreased.

Because the secondary process "c" is not running, it will consume unnecessary power when it is frequently pulled up by the system. In order to avoid unnecessary response when pulling up next time, a priority level of the secondary process "c" can be decreased. For example, as other association processes of application A in FIG. 9 are in the running state, priority levels of other association processes of application A are not adjusted, maintaining at "3", while the priority level of the secondary process "c" is decreased, being adjusted at "4". If the system pulls up processes having a priority level "3" or more than "3" when pulling up, only other association processes of application A will be pulled up, and the secondary process "c" will not respond. Thus, the power consumption of the electronic device can be reduced, and the endurance of the electronic device can be improved.

Figure 10:
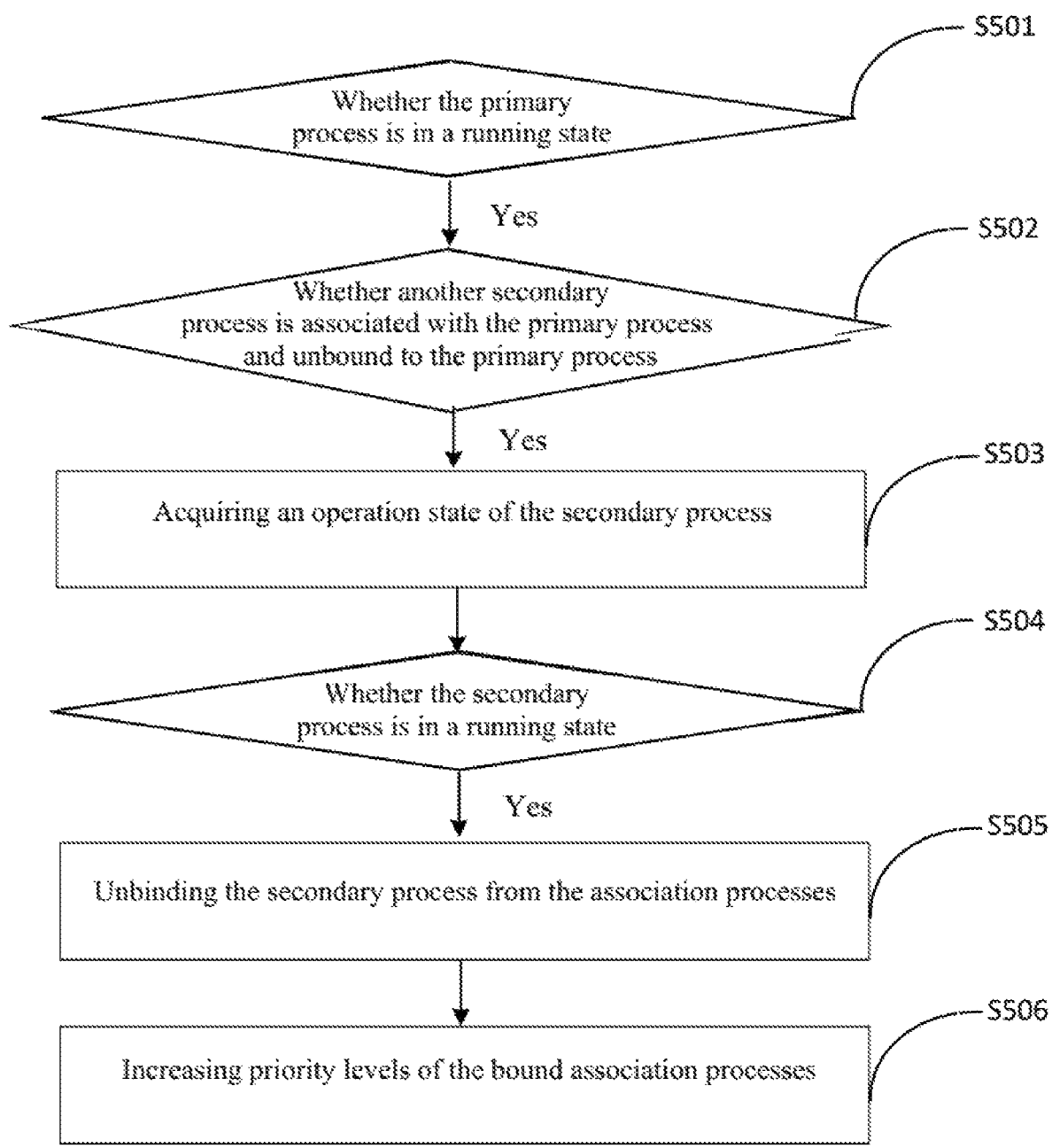
FIG. 10 is a fourth flow chart for adjusting a binding state and a priority level of an association process according to embodiments of the present disclosure.

FIG. 10 is a fourth flow chart for adjusting a binding state and a priority level of an association process according to embodiments of the present disclosure.

In some embodiments, adjusting a binding state between the primary process and a secondary process according to operation states of the primary process and the secondary process includes: acquiring an operation state of another secondary process when the primary process is in a running state and there is the another secondary process associated with the primary process and unbound to the primary process; and adding the another secondary process into the set of association processes to bind the another secondary process to the primary process when the secondary process is in a running state.

As shown in FIG. 10, the flow includes actions/operations in the following.

At block S501, whether the primary process is in a running state is determined. If yes, whether there is another secondary process associated with the primary process and unbound to the primary process is determined. After the operation states of the primary process and the secondary process related to the application A are obtained, the operation state of the primary process is determined.

Figure 11:
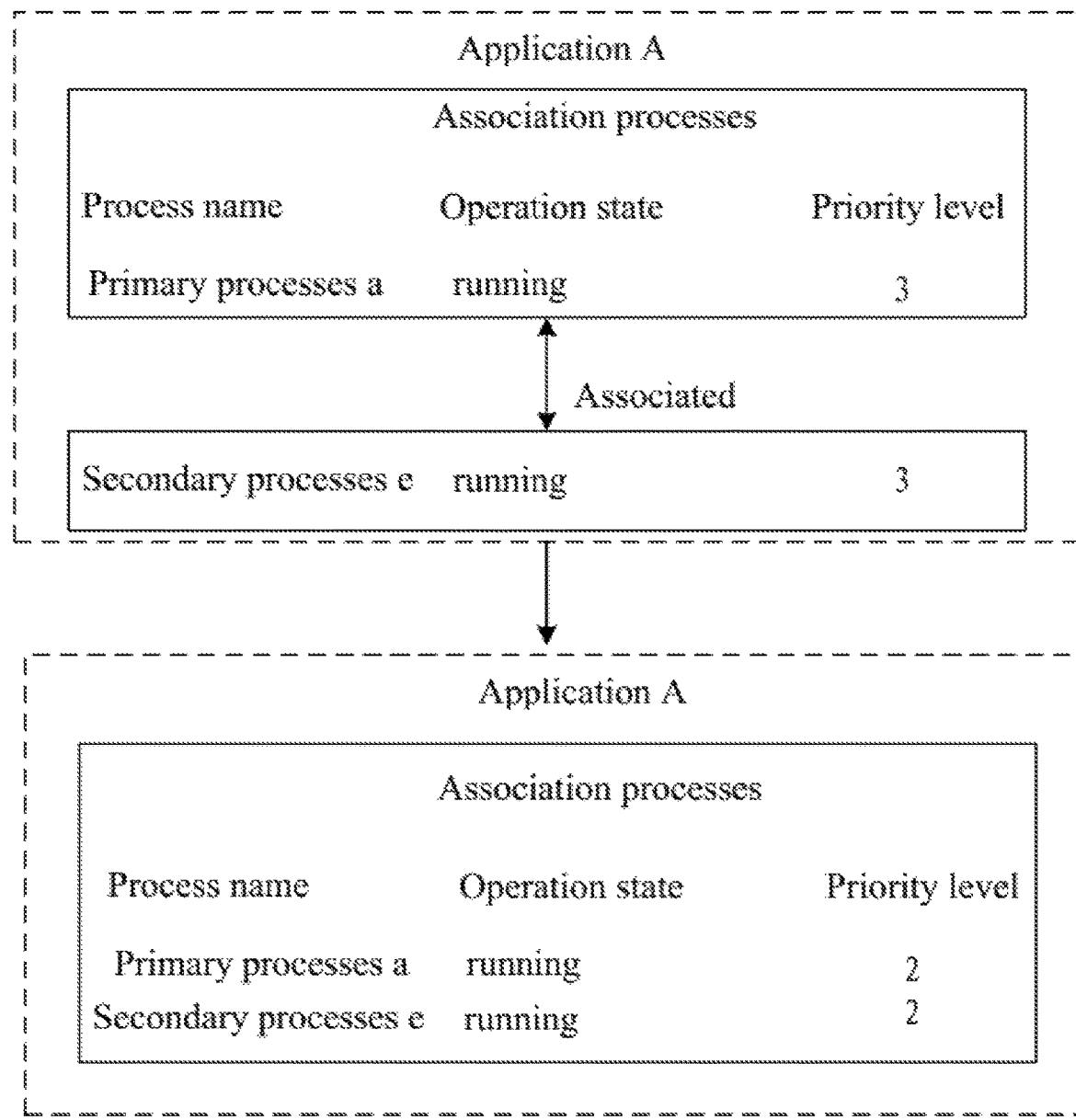
FIG. 11 is a schematic diagram of a sixth application scenario for a method for process management according to embodiments of the present disclosure.

FIG. 11 illustrates operation states and priority levels of the association processes related to the application A. It can be known that the primary process "a" of the application A is in a running state, and it can be continued to determine whether there is another secondary process associated with the primary process and unbound to the primary process.

At block S502, whether there is another secondary process associated with the primary process and unbound to the primary process is determined. If yes, an operation state of the secondary process is obtained.

In FIG. 11, it can be known that the secondary process "e" is associated with the primary process and unbound to the primary process, and the secondary process "e" is in a running state. In this case, it may be considered that the secondary process "e" is bound to the primary process "a". When the secondary process "e" meets the above condition, an operation state of the secondary process "e" may be obtained.

At block S503, an operation state of the secondary process is acquired.

At block S504, whether the secondary process is in a running state. If yes, the secondary process is bound to the primary process.

At block S505, the secondary process is added into the set of association processes to be bound to the primary process. In some embodiments, the binding may be the reverse of the unbinding, a part of processes are bound by modifying relevant parameters of the application A, so that the processes can be processed as a whole when process invoking or priority level setting is performed.

As shown in FIG. 11, for example, the secondary process "e" is in the running state, and the primary process "a" is also in the running state. In this case, the secondary process "e" is bound to the primary process "a" so that one entire process combination is formed.

At block S506, a priority level of the bound set of association process is increased.

After the secondary process "e" has been bound to the primary process "a" to form the entire process combination, since those two processes are running, it is possible that the processes have high usage rate, and then priority levels of the processes may be increased. Since the processes are in a binding state, parameters of the bound association processes are just needed to be adjusted, and then a priority adjustment of the bound association processes is completed. This improves management efficiency of the association processes, reduces power consumption of the electronic device, and improves the endurance of the electronic device.

For example, because the primary process "a" and the secondary process "e" in FIG. 11 are in the running state, priority levels of the bound association processes are adjusted to be "2" after those two processes are bound. If the system pulls up processes having a priority "3" or more than "3" when pulling up, only association processes of application A will be pulled up.

Figure 12:
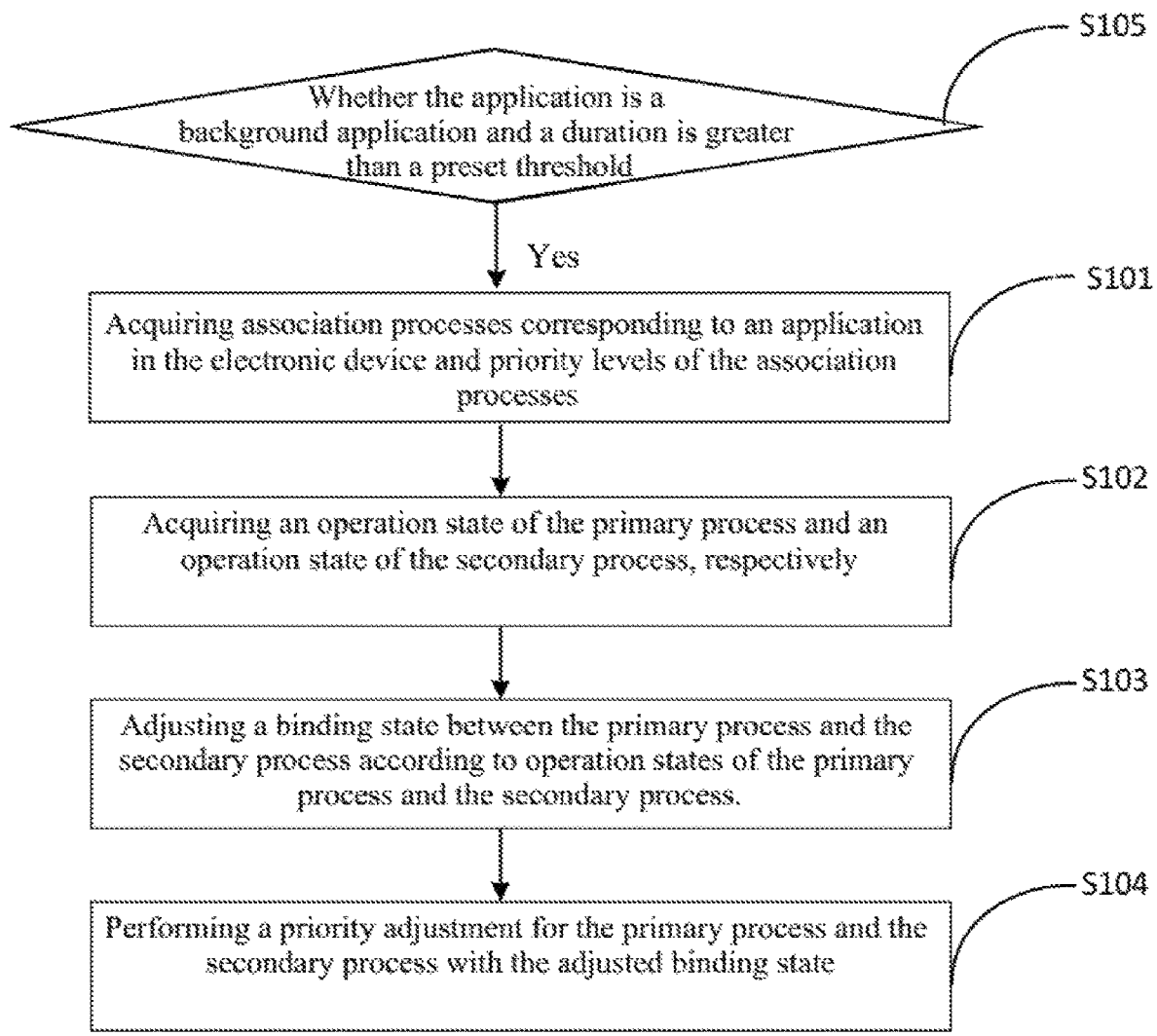
FIG. 12 is another flow chart implementing a method for process management according to embodiments of the present disclosure.

FIG. 12 is another flow chart implementing a method for process management according to embodiments of the present disclosure.

As shown in FIG. 12, blocks S101-S104 are same to that in FIG. 2, of which the specific content may referred to description of those blocks in FIG. 2.

In addition to the blocks shown in FIG. 2, before block S101, the method further includes action/operation in the following block.

At block S105, the method determines whether the application is a background application and a duration of the application being in the background is greater than a preset threshold. If the application is a background application, and the duration of the application being in the background is greater than the preset threshold, block S101 is performed.

In some embodiments, the background application is stored and run in a cache of the electronic device, and it can be run by executing a program preset by itself without a user's operation. When the application is in the background and running in the background, the duration of the application being in the background can be obtained by a timer of the electronic device. The preset threshold may be a duration preset at factory, or a duration preset by the user, for example, 30 minutes or 1 hour. The preset threshold may be set according to requirements, which is not limited herein.

When the application is a background application, and the duration of the application is in the background is greater than the preset threshold, it is triggered to acquire association processes corresponding to the application in the electronic device and priority levels of the association process. Since the application has low usage rate when the application is in the background, it is necessary to perform a process management for the application. Setting a condition can make the above-mentioned acquiring action more intelligent, so that the electronic device can manage priority levels of the processes in time, and control a pull-up of the application according to the priority levels of the processes next time. This reduces the power consumption of the electronic device.

Figure 13:
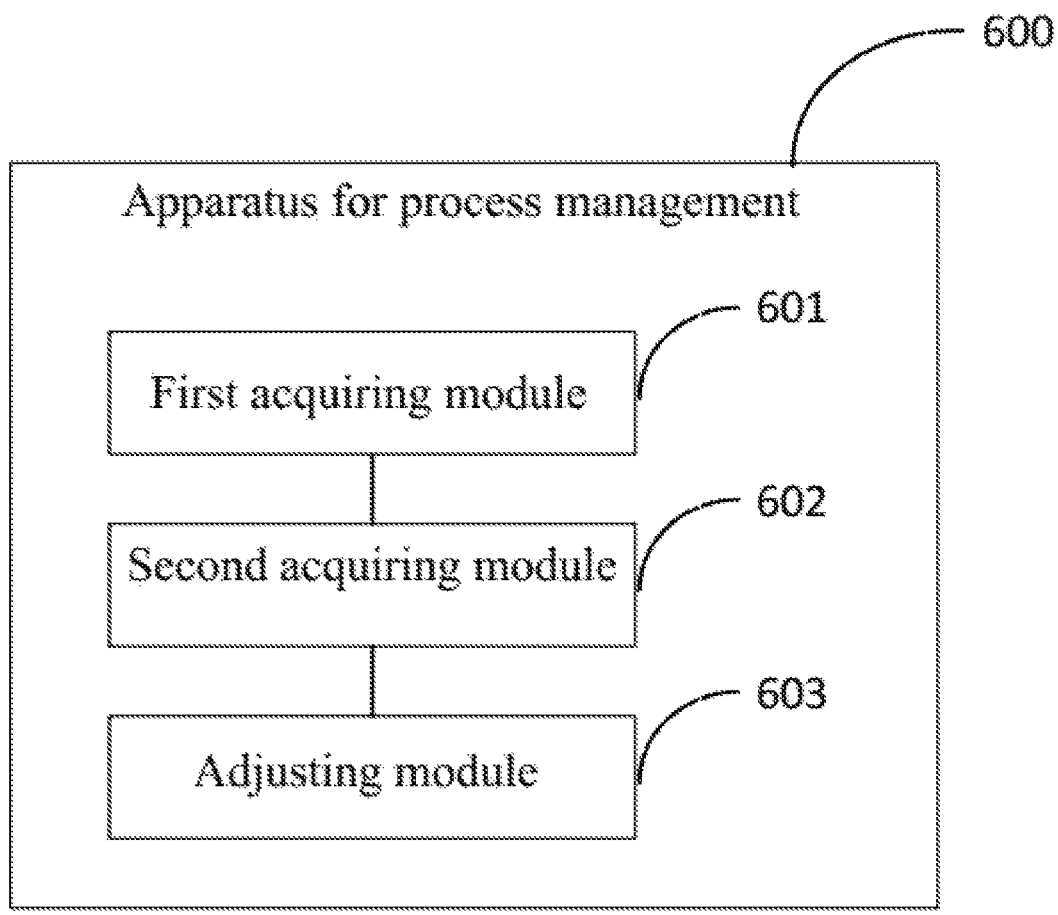
FIG. 13 is a structural schematic diagram of an apparatus for process management according to embodiments of the present disclosure.

FIG. 13 illustrates a structure of an apparatus for process management. For the convenience of description, only parts related to the content of the present disclosure are shown in the figure.

As shown in FIG. 13, the apparatus includes a first acquiring module 601, a second acquiring module 602, and an adjusting module 603. The first acquiring module 601 is configured for acquiring a set of association processes corresponding to an application in the electronic device and priority levels of association processes in the set of association processes.

In some embodiments, the set of association processes include a primary process of the application and at least one of secondary process bound to the primary process. The primary process is a process for implementing most of main functions of the application and controlling to invoke the secondary process associated with the primary process. In some cases, the primary process can also be called as a parent process or a program process. A secondary process is used for processing service functions related to the application, such as updating and monitoring the application. In some cases, the secondary process can also be called as a child process or a service process.

Acquiring the set of association processes corresponding to the application means that information of the association processes may be acquired from a system process configured to manage the association processes. The information may be used for managing the association processes such as shut-downing, starting-up, and adjusting binding relationship and priority, which is not limited herein.

The second acquiring module 602 is configured for acquiring an operation state of the primary process and an operation state of each of the at least one secondary process, respectively.

In some embodiments, the operation state of the primary process and the operation state of each of the at least one secondary process may be acquired by a related program or process for managing the operation state of the primary process and the operation state of each of the at least one secondary process. The operation state may include "running" and "non-running". The specific state types can be defined according to the actual situation.

The adjusting module 603 is configured for adjusting a binding state between the primary process and each of the at least one secondary process according to the operation state of the primary process and the operation state of each of the at least one secondary process.

In some embodiments, most secondary processes associated with the primary process are bound to the primary process. Thus, the secondary process associated with the primary process can be invoked at any time when the primary process is running, which improves processing efficiency, the secondary process associated with the primary process can be shut down following the primary process, or a priority level of the primary process and a priority level of the secondary process associated with the primary process may be adjusted simultaneously when priority adjustment is performed for the application, making the primary process and the secondary process associated with the primary process be adjusted simultaneously.

In some embodiments, after all the operation states of the association processes of the application are obtained, the binding state between the primary process and each of the at least one secondary process in the set of association processes are adjusted according to the operation states of the primary process and the secondary process in the set of association processes.

In some embodiments, after the binding state between the primary process and each of the at least one secondary process is adjusted according to the operation states of the primary process and each of the at least one secondary process, one corresponding process of the application may make the entire association processes to form one or two process combinations. At this time, the system can perform a priority adjustment according to operation state of the one or two process combinations to decrease a priority level of a process in-unuse and maintain or increase a priority level of a process in-use. Thus, it can be achieved that a targeted adjustment is performed for the priority levels of the primary process and the at least one secondary process corresponding to the application according to the operation states of the processes.

Figure 14:
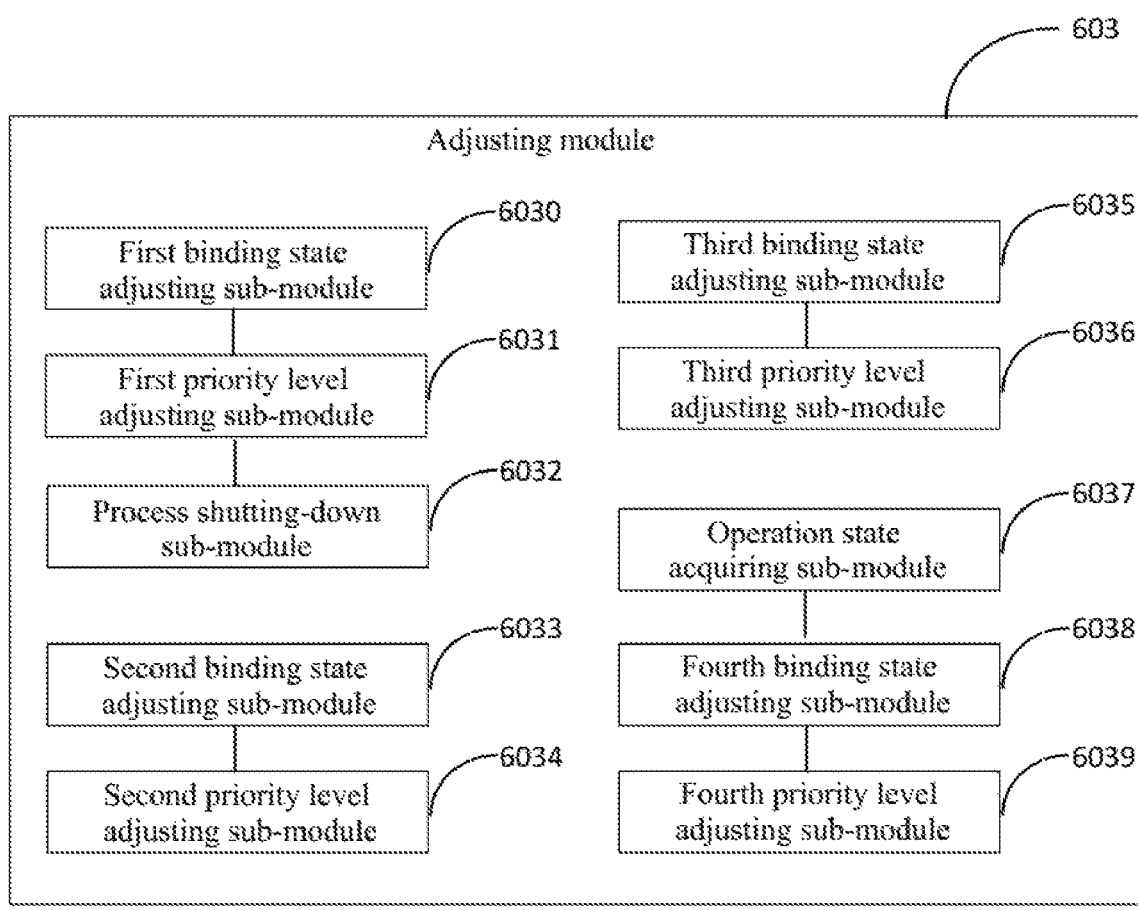
FIG. 14 is a structural schematic diagram of an adjustment module according to embodiments of the present disclosure.

FIG. 14 is a structural schematic diagram of an adjustment module 603 according to the present disclosure. The adjusting module includes a first binding state adjusting sub-module 6030, a first priority level adjusting sub-module 6031, a process shutting-down sub-module 6032, a second binding state adjusting sub-module 6033, a second priority level adjusting sub-module 6034, a third binding state adjusting sub-module 6035, a third priority level adjusting sub-module 6036, an operation state acquiring sub-module 6037, a fourth binding state adjusting sub-module 6038, a fourth priority level adjusting sub-module 6039.

In some embodiments, adjusting a binding state between the primary process and each of the at least one secondary process according to the operation state of the primary process and the operation state of each of the at least one secondary process includes: maintaining the binding state between the primary process and the at least one secondary process in response to the primary process and the at least one secondary process all being in a non-running state.

As shown in FIG. 14, the adjusting module 603 includes the following.

The first binding state adjusting sub-module 6030 is configured for determining whether both the primary process and a secondary process are in a non-running state.

After the operation states of the primary process and the secondary process related to the application A are obtained, whether both the primary process and the secondary process are in the non-running state is determined. If both the primary process and the secondary process are in the non-running state, it indicates that the application A is an application with low usage rate. At this time, the binding state between the primary process and the secondary process is maintained, and then priority adjustment may be performed for the entire association processes of application A.

The first priority level adjusting sub-module 6031 is configured for decreasing priority levels of the primary process and the secondary process.

In some embodiments, if the operation states of both the primary process and the secondary process are in the non-running state, priority levels of the whole association processes of the application A may be decreased. This avoids a process with a lower usage rate being pulled up the next time the system pulls up, and then reduces power consumption of the electronic device.

The process shutting-down sub-module 6032 is configured for shutting down the set of association processes to release buffer resources occupied by the set of association processes.

When a process is in a non-running state, it may still occupy a certain amount of buffer resources. In this case, an association process can be completely shut down to release buffer resources occupied by the association process, which improves the operating efficiency of the electronic device.

In some embodiments, adjusting a binding state between the primary process and each of the at least one secondary process according to the operation state of the primary process and the operation state of each of the at least one secondary process includes: unbinding a specific secondary process from the set of association processes in response to the primary process being in a non-running state and the specific secondary process of the at least one secondary process being in a running state.

As shown in FIG. 14, the adjusting module 603 further includes the following.

The second binding state adjusting sub-module 6033 is configured for unbinding the secondary process in the running state from the set of association processes when the primary process is in a non-running state and there is the secondary process is in a running state.

After the operation states of the primary process and the specific secondary process related to the application A is obtained, the operation state of the primary process is determined. It is further determined whether there is a specific secondary process being in a running state when the operation state of the primary process is in the non-running state.

In some embodiments, during the unbinding, a part of processes are unbound by modifying relevant parameters of the application A, so that the processes can be processed separately when process invoking or process priority level setting is performed.

As shown in FIG. 7, for example, the secondary process "c" is in the running state, and the other association processes are in the non-running state. In this case, the secondary process "c" can be unbound to the primary process of the application A, such that two process combinations are formed.

The second priority level adjusting sub-module 6034 is configured for decreasing priority levels of the unbound set of association processes.

Because other association processes of application A are not running, they will consume unnecessary power when they are frequently pulled up by the system. In order to avoid unnecessary response when pulling up next time, priority levels of other association processes of application A can be decreased.

In some embodiments, adjusting a binding state between the primary process and each of the at least one secondary process according to the operation state of the primary process and the operation state of each of the at least one secondary process includes: unbinding a specific secondary process from the set of association processes in response to the primary process being in a running state and the specific secondary process of the at least one secondary process being in a non-running state.

As shown in FIG. 14, the adjusting module 603 further includes the following.

The third binding state adjusting sub-module 6035 is configured for unbinding a secondary process from the association processes when the primary process is in a running state and there is the secondary process is in a non-running state.

After the operation states of the primary process and the specific secondary process related to the application A are obtained, the operation state of the primary process is determined. It is further determined whether there is a specific secondary process in a running state when the operation state of the primary process is in the non-running state.

In some embodiments, during the unbinding, a part of processes are unbound by modifying relevant parameters of the application A, so that the processes can be processed separately when process invoking or priority level setting is performed.

The third priority level adjusting sub-module 6036 is configured for decreasing a priority level of the unbound specific secondary process.

In some embodiments, adjusting a binding state between the primary process and a secondary process according to operation states of the primary process and the secondary process includes: acquiring an operation state of another secondary process when the primary process is in a running state and there is the another secondary process associated with the primary process and unbound to the primary process; and adding the another secondary process into the set of association processes to bind the another secondary process to the primary process when the secondary process is in a running state.

As shown in FIG. 14, the adjusting module 603 further includes the operation state acquiring sub-module 6037, which is configured for acquiring an operation state of another secondary process when the primary process is in a running state and there is the another secondary process associated with the primary process and unbound to the primary process.

After the operation states of the primary process and the secondary process related to the application A are obtained, the operation state of the primary process is determined.

The fourth binding state adjusting sub-module 6038 is configured for adding the another secondary process into the set of association processes to bind the another secondary process to the primary process when the secondary process is in a running state.

In some embodiments, the binding may be the reverse of the unbinding, a part of processes are bound by modifying relevant parameters of the application A, so that the processes can be processed as a whole when process invoking or priority level setting is performed.

The fourth priority level adjusting sub-module 6039 is configured for increasing priority levels of the bound set of association process.

Figure 15:
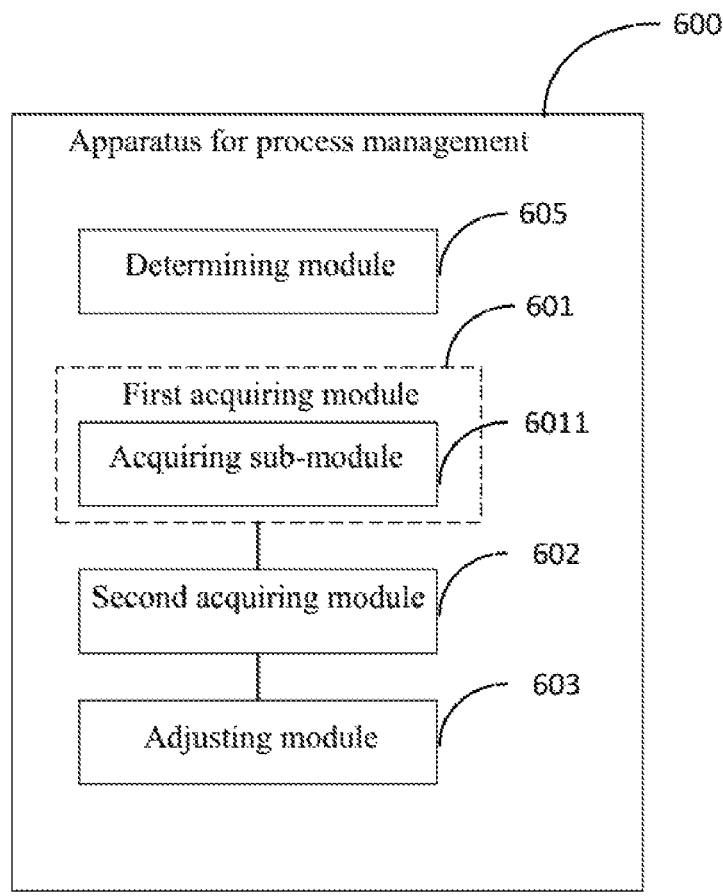
FIG. 15 is another structural schematic diagram of an apparatus for process management according to embodiments of the present disclosure.

FIG. 15 is another structural schematic diagram of an apparatus for process management according to embodiments of the present disclosure.

As shown in FIG. 15, structures and functions of 601-603 in the figure is same to that in FIG. 13, of which specific content may be referred to description of that in FIG. 13.

In addition to the structure shown in FIG. 13, the apparatus further includes a determining module 605. The first acquiring module 601 includes an acquiring sub-module 6011.

The determining module 605 is configured for determining whether the application is a background application and a duration of the application being in the background is greater than a preset threshold.

In some embodiments, the background application is stored and run in a cache of the electronic device, and it can be run by executing a program preset by itself without a user's operation. When the application is in the background and running in the background, the duration of the application being in the background can be obtained by a timer of the electronic device. The preset threshold may be a duration preset at factory, or a duration preset by the user, for example, 30 minutes or 1 hour. The preset threshold may be set according to requirements, which is not limited herein.

The first acquiring module 601 includes the following.

The acquiring sub-module 6011 is configured for acquiring the association processes corresponding to the application in the electronic device and the priority levels of association processes when the application is the background application and the duration of the application being in the background is greater than the preset threshold.

When the application is a background application, and the duration of the application is in the background is greater than the preset threshold, it is triggered to acquire association processes corresponding to the application in the electronic device and priority levels of the association process. Since the application has low usage rate when the application is in the background, it is necessary to perform a process management for the application. Setting a condition can make the above-mentioned acquiring action more intelligent, so that the electronic device can manage priority levels of the processes in time, and control a pull-up of the application according to the priority levels of the processes next time. This reduces the power consumption of the electronic device.

Figure 16:
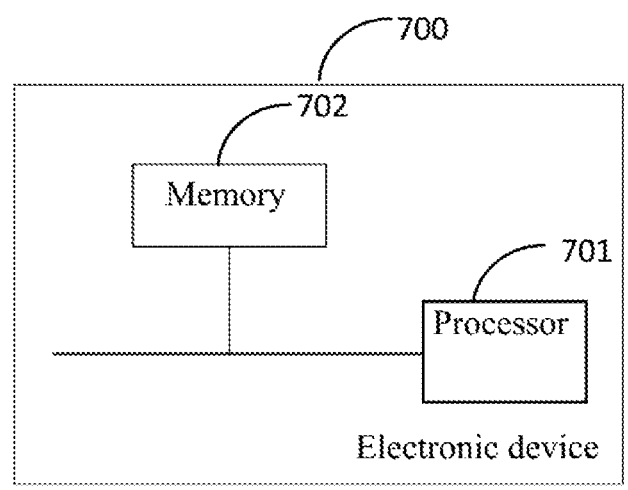
FIG. 16 is a schematic structural diagram of an electronic device according to embodiments of the present disclosure.

An electronic device is further provided in embodiments of the present disclosure, which may be a smart phone, a tablet computer, a desktop computer, a notebook, a palmtop computer, or the like. As shown in FIG. 16, the electronic device 700 includes a processor 701 and a memory 702. The processor 701 is electrically coupled to the memory 702.

The processor 701 is a control center of the electronic device 700, connected to respective portions of the entire electronic device using various interfaces and circuits, and performs various functions of the electronic device 700 and data processing by running or loading application programs in the memory 702 and invoking data stored in the memory 702. Thus, the electronic device 700 is monitored as whole.

The memory 702 can be used to store software programs and modules, and the processor 701 executes various function applications and data processing by performing software programs and modules stored in the memory 702. The memory 702 may mainly include a storage program area and a storage data area, wherein the storage program area may store an operating system, an application program required for at least one function (such as a sound playing function, an image playing function, etc.), and the like. The storage data area may store data created according the use of the server, etc. Moreover, the memory 702 can include a high speed random access memory, and can also include a non-transitory memory, such as at least one magnetic disk storage device, flash, or other transitory solid state storage device. Accordingly, memory 702 can also include a memory controller to provide an access for processor 701 to memory 702.

In the embodiments of the present disclosure, the processor 701 in the electronic device 700 loads the instructions corresponding to a process of one or more application programs into the memory 702 according to the following actions/operations, and the application programs stored in the memory 702 is executed by the processor 701 to implement various functions.

Acquiring a set of association processes corresponding to an application in the electronic device and priority levels of association processes, wherein the set of association processes includes a primary process of the application and at least one secondary process bound to the primary process; acquiring an operation state of the primary process and an operation state of each of the at least one secondary process, respectively; and adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

In some embodiments, the processor 701 is further configured to perform the following.

Maintaining the binding state between the primary process and the at least one secondary process in response to the primary process and the at least one secondary process all being in a non-running state; and decreasing priority levels of the primary process and the at least one secondary process.

In some embodiments, the processor 701 is further configured to perform the following.

Shutting down the set of association processes to release buffer resource occupied by the set of association processes.

In some embodiments, the processor 701 is further configured to perform the following.

Unbinding a specific secondary process from the set of association processes in response to the primary process being in a non-running state and the specific secondary process of the at least one secondary process being in a running state; and decreasing priority levels of the unbound set of association processes, wherein the unbound set of association processes includes the primary process in the non-running state and others of the at least one secondary process without the specific secondary process.

In some embodiments, the processor 701 is further configured to perform the following.

Unbinding a specific secondary process from the set of association processes in response to the primary process being in a running state and the specific secondary process of the at least one secondary process being in a non-running state; and decreasing a priority level of the unbound specific secondary process in the non-running state.

In some embodiments, the processor 701 is further configured to perform the following.

Acquiring an operation state of another secondary process in response to the primary process being in a running state and the another secondary process associated with the primary process being unbound to the primary process; adding the another secondary process into the set of association processes to bind the another secondary process to the primary process in response to the another secondary process being in the running state; and increasing priority levels of the added set of association processes.

In some embodiments, the processor 701 is further configured to perform the following.

Determining whether the application is a background application and a duration of the application being in the background is greater than a preset threshold, to perform the acquiring a set of association processes corresponding to an application in the electronic device and priority levels of association processes, in response to the application being the background application and the duration being greater than the preset threshold.

Figure 17:
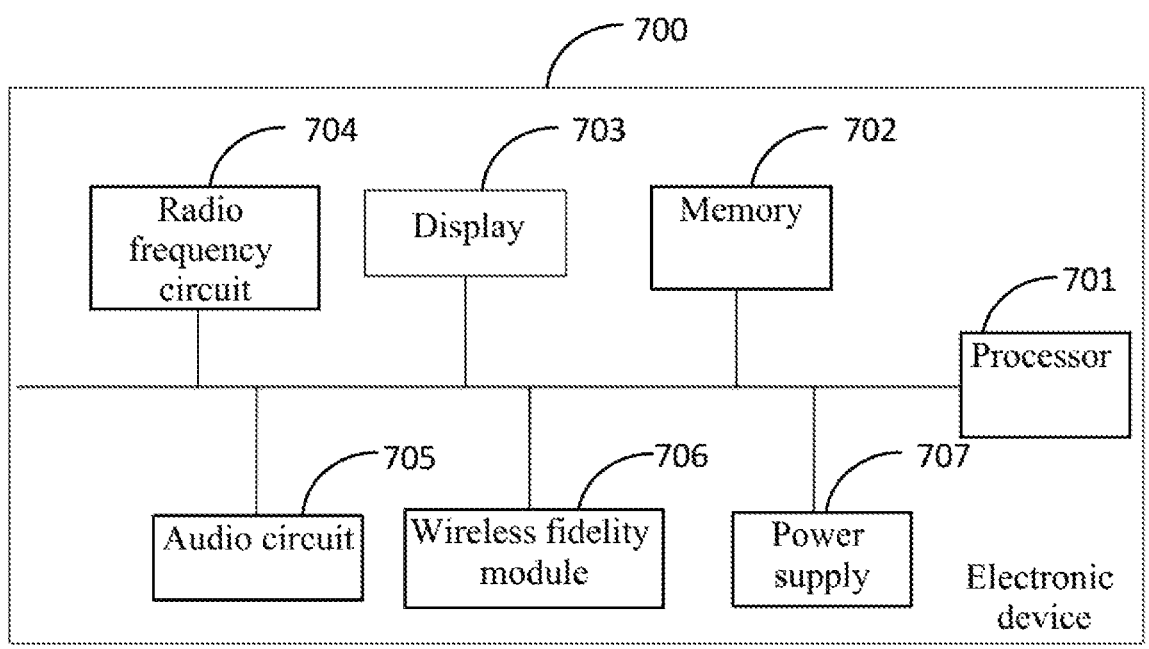
FIG. 17 is another schematic structural diagram of an electronic device according to embodiments of the present disclosure.

Referring to FIG. 17 together, in some embodiments, the electronic device 700 may further include a display 703, a radio frequency circuit 704, an audio circuit 705, a wireless fidelity module 706, and a power supply 707. The display 703, the radio frequency circuit 704, the audio circuit 705, the wireless fidelity module 706, and the power supply 707 are electrically coupled to the processor 701, respectively.

The display 703 can be used to display information input by a user or information provided to a user, as well as various graphical user interfaces, which can be composed of graphics, text, icons, video, and any combination thereof. The display 703 may include a display panel. In some embodiments, a liquid crystal display (LCD), or an organic light emitting diode (OLED) and the like may be used to form the display panel.

The radio frequency circuit 704 can be used to transmit and receive radio frequency signals to establish wireless communication with network devices or other electronic devices through wireless communication to transmit and receive signals with network devices or other electronic devices.

The audio circuit 705 can be used to provide an audio interface between a user and an electronic device through a speaker or a microphone.

The wireless fidelity module 706 can be used for short-range wireless transmission, and help users to send and receive emails, browse websites, and access streaming media. It provides users with broadband wireless Internet access.

The power supply 707 can be used to power various components of the electronic device 700. In some embodiments, the power supply 707 can be logically coupled to the processor 701 through a power management system to manage functions through the power management system such as managing charging, discharging, and power management.

Although not shown in FIG. 17, the electronic device 700 may further include a camera, a Bluetooth module, and the like, of which details are not described herein.

A storage medium is further provided in embodiments of the present disclosure. The storage medium stores a plurality of instructions, and the plurality of instructions are configured to be loaded by a processor to execute the method for process management in the foregoing embodiments, for example, acquiring a set of association processes corresponding to an application in the electronic device and priority levels of association processes, wherein the set of association processes includes a primary process of the application and at least one secondary process bound to the primary process; acquiring an operation state of the primary process and an operation state of each of the at least one secondary process, respectively; and adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

It should be noted that those skilled in the art may understand that all or part of the steps of the foregoing embodiments may be completed by a program to instruct related hardware. The program may be stored in a computer readable medium, which can include but are not limited to a read only memory (ROM), a random access memory (RAM), magnetic or optical disk.

The method and apparatus for process management, the storage media, and the electronic device according to embodiments of the present disclosure have been described in detail in the forgoing. The principles and embodiments of the present disclosure are set forth through specific examples herein, and the above description of the embodiments is just to help understand the method of the present disclosure and its core ideas. Meanwhile, for those skilled in the art, according to the idea of the present disclosure, there will be changes in the specific implementation manner and the scope of application. In summary, the contents of this specification are not understood as the limitations of the present disclosure.

What is claimed is:

1. A method for process management in an electronic device, comprising:
   acquiring a set of association processes corresponding to an application in the electronic device and priority levels of association processes, wherein the set of association processes comprises a primary process of the application and at least one secondary process bound to the primary process;
   acquiring an operation state of the primary process and an operation state of each of the at least one secondary process, respectively; and
   adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

2. The method of claim 1, wherein the adjusting the binding state between the primary process and each of the at least one secondary process and performing the priority adjustment for the primary process and each of the at least one secondary process between which are in the adjusted binding state according to the operation state of the primary process and the operation state of each of the at least one secondary process comprises:
   maintaining the binding state between the primary process and the at least one secondary process in response to the primary process and the at least one secondary process all being in a non-running state; and
   decreasing priority levels of the primary process and the at least one secondary process.

3. The method of claim 2, further comprising:
   after the decreasing the priority levels of the primary process and the at least one secondary process, shutting down the set of association processes to release buffer resource occupied by the set of association processes.

4. The method of claim 1, wherein the adjusting the binding state between the primary process and each of the at least one secondary process and performing the priority adjustment for the primary process and each of the at least one secondary process between which are in the adjusted binding state according to the operation state of the primary process and the operation state of each of the at least one secondary process comprises:
   unbinding a specific secondary process from the set of association processes in response to the primary process being in a non-running state and the specific secondary process of the at least one secondary process being in a running state; and
   decreasing priority levels of the unbound set of association processes, wherein the unbound set of association processes comprises the primary process in the non-running state and others of the at least one secondary process without the specific secondary process.

5. The method of claim 1, wherein the adjusting the binding state between the primary process and each of the at least one secondary process and performing the priority adjustment for the primary process and each of the at least one secondary process between which are in the adjusted binding state according to the operation state of the primary process and the operation state of each of the at least one secondary process comprises:
   unbinding a specific secondary process from the set of association processes in response to the primary process being in a running state and the specific secondary process of the at least one secondary process being in a non-running state; and
   decreasing a priority level of the unbound specific secondary process in the non-running state.

6. The method of claim 1, further comprising:
   acquiring an operation state of another secondary process in response to the primary process being in a running state and the another secondary process associated with the primary process being unbound to the primary process;
   adding the another secondary process into the set of association processes to bind the another secondary process to the primary process in response to the another secondary process being in the running state; and
   increasing priority levels of the added set of association processes.

7. The method of claim 1, further comprising:
   before the acquiring the set of association processes corresponding to the application in the electronic device and the priority levels of the association processes, determining whether the application is a background application and a duration of the application being in the background is greater than a preset threshold, to perform the acquiring a set of association processes corresponding to an application in the electronic device and priority levels of association processes, in response to the application being the background application and the duration being greater than the preset threshold.

8. An electronic device comprising a non-transitory memory storing a plurality of instructions, and a processor, wherein loading the plurality of instructions, the processor is configured to perform:
   acquiring a set of association processes corresponding to an application in the electronic device and priority levels of association processes, wherein the set of association processes comprises a primary process of the application and at least one secondary process bound to the primary process;
   acquiring an operation state of the primary process and an operation state of each of the at least one secondary process, respectively; and
   adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

9. The electronic device of claim 8, wherein the processor is further configured to perform:
   maintaining the binding state between the primary process and the at least one secondary process in response to the primary process and the at least one secondary process all being in a non-running state; and
   decreasing priority levels of the primary process and the at least one secondary process.

10. The electronic device of claim 9, wherein the processor is further configured to perform:
   after the decreasing the priority levels of the primary process and the at least one secondary process, shutting down the set of association processes to release buffer resource occupied by the set of association processes.

11. The electronic device of claim 8, wherein the processor is further configured to perform:
   unbinding a specific secondary process from the set of association processes in response to the primary process being in a non-running state and the specific secondary process of the at least one secondary process being in a running state; and
   decreasing priority levels of the unbound set of association processes, wherein the unbound set of association processes comprises the primary process in the non-running state and others of the at least one secondary process without the specific secondary process.

12. The electronic device of claim 8, wherein the processor is further configured to perform:
   unbinding a specific secondary process from the set of association processes in response to the primary process being in a running state and the specific secondary process of the at least one secondary process being in a non-running state; and
   decreasing a priority level of the unbound specific secondary process in the non-running state.

13. The electronic device of claim 8, wherein the processor is further configured to perform:
   acquiring an operation state of another secondary process in response to the primary process being in a running state and the another secondary process associated with the primary process being unbound to the primary process;
   adding the another secondary process into the set of association processes to bind the another secondary process to the primary process in response to the another secondary process being in the running state; and
   increasing priority levels of the added set of association processes.

14. The electronic device of claim 8, the processor is further configured to perform:
   determining whether the application is a background application and a duration of the application being in the background is greater than a preset threshold, to perform the acquiring a set of association processes corresponding to an application in the electronic device and priority levels of association processes, in response to the application being the background application and the duration being greater than the preset threshold.

15. A non-transitory storage medium storing a plurality of instructions, when executed, causing a processor to perform a method for process management, wherein the method comprises:
   acquiring a primary process of an application and at least one secondary process and priority levels of the primary process and the at least one secondary process, wherein the at least one secondary process is bound to the primary process;
   acquiring an operation state of the primary process and an operation state of each of the at least one secondary process, respectively; and
   adjusting a binding state between the primary process and each of the at least one secondary process and performing a priority adjustment for the primary process and each of the at least one secondary process between which are in the adjusted binding state according to the operation state of the primary process and the operation state of each of the at least one secondary process.

16. The non-transitory storage medium of claim 15, wherein the at least one secondary process comprises a first secondary process, and the primary process and the first secondary process all are in a non-running state; and
   the first secondary process is maintained to be bound to the primary in response to the primary process and the first secondary process all being in a non-running state.

17. The non-transitory storage medium of claim 16, wherein the primary process and the first secondary process are shut down.

18. The non-transitory storage medium of claim 15, wherein the at least one secondary process comprises a first secondary process, and the primary process is in a non-running state and the first secondary process is in a running state; and
   the first secondary process of the at least one secondary process is adjusted to be unbound to the primary process, and priority levels of the primary process and others of the at least one secondary process are decreased, in response to the primary process being in the non-running state and the first secondary process being in the running state.

19. The non-transitory storage medium of claim 15, wherein the at least one secondary process comprises a first secondary process, and the primary process is in a running state and the first secondary process is in a non-running state; and
   the first secondary process of the at least one secondary process is adjusted to be unbound to the primary process, and priority levels of the first secondary process is decreased, in response to the primary process being in the running state and the first secondary process being in the non-running state.

20. The non-transitory storage medium of claim 15, wherein the method further comprises:
   acquiring an operation state of another secondary process in response to the primary process being in a running state and the another secondary process associated with the primary process being unbound to the primary process;
   binding the another secondary process to the primary process in response to the another secondary process being in a running state; and
   increasing priority levels of the primary process and the another secondary process.

* * * * *